United States Patent Office 3,551,204

Patented Dec. 29, 1970

3,551,204

PROCESS AND COMPOSITION FOR RECOVERING ELECTRONIC DEVICES FROM ENCAPSULATION IN POTTING COMPOUNDS

Justin C. Bolger, Needham, and H. James White, Arlington, Mass., assignors to Amicon Corporation, Lexington, Mass., a corporation of Massachusetts No Drawing. Filed Aug. 8, 1967, Ser. No. 659,012
Int. Cl. C11d *7/06, 7/50;* C23g *5/02*
U.S. Cl. 134—42 1 Claim

ABSTRACT OF THE DISCLOSURE

A solvent composition capable of selectively dissolving polyurethane and various epoxy resin systems while leaving metallic and most other polymer systems undamaged is disclosed. This composition contains (a) about 0.1 to 3.0 parts by weight water, (b) about 3 to 7 parts by weight of an alkali metal hydroxide and (c) about 90 to 96.9 parts by weight of an organic solvent selected from the group of lower monohydric alkanols of 2 to 4 carbon atoms and ethylene glycol mono alkyl ethers wherein the alkyl group contains up to 4 carbon atoms. This composition is particularly useful in providing means to recover plastic and metal electronic components which have been encapsulated in resinous potting compounds.

BACKGROUND OF THE INVENTION

In the electronic-packaging art, it has long been known to use protective potting compounds for encapsulating sensitive electronic components and systems. Such components and systems usually contain expensive electronic devices; many such devices are contained in articles rejected in quality-control tests carried out on the production line or are contained in experimental apparatus which serve short-duration test purposes or prove to be an experimental failure. Therefore, it has been desirable to have a means for easily and economically recovering these electronic devices from potting compounds. Of course, in providing such a means not only should suitable solvation of the potting compounds be achieved but, as importantly, metallic and other polymeric parts which are embedded in the potting compounds should be recoverable without significant damage thereto. This presents a real problem because a wide variety of polymers and chemically-sensitive metals are usually used in preparing electronic devices.

SUMMARY OF THE INVENTION

Therefore it is an object of the invention to provide selective solvent compositions for thermosetting polyurethane, polyester and epoxy potting compounds.

It is a further object of the invention to provide such selective solvent compositions which do not attack, to any significant degree, common metallic surfaces.

Moreover, it is an object of the invention to provide means for conveniently utilizing the invention without use of excessively dangerous solvents.

Another object of the invention is to provide non-hazardous solvent compositions having relatively high flash points.

The above objects have been substantially achieved as a result of the discovery that very small and limited quantities of water when compounded with larger quantities of selected organic solvents and certain quantities of strong bases, provides a highly useful solvent for many cured thermosetting urethane polyester and epoxy resin systems without attacking most other polymer systems.

Compositions of the invention usually will comprise:

(a) From 0.1 to 3.0 parts by weight of water, (b) From 0.5 to 20 parts strong inorganic base, and (c) A sufficient quantity of a selected organic solvent to make up 100 parts.

The quantity of water selected for incorporation into the composition of the invention can be selected to provide a balance between non-reactivity to such metals as aluminum and magnesium. Normally as little water as desirable should be incorporated when aluminum metal is to be exposed to the solvent. On the other hand at least about 0.1% water by weight is required for protection of magnesium. For this reason the most advantageous water level is between 0.1% to 1.0%, although quantities up to about 3% are suitable for most applications; when attack on metals is not a problem the amount of water can be somewhat higher, for example 5% of water would be acceptable.

Strong bases which can be used in the compositions of the invention include the alkali metal hydroxides such as potassium hydroxide and sodium hydroxide. The strong base is advantageously between 3 and 7 percent if versatile performance is to be expected of the solvent composition. Below 3%, the rate of solvation on most urethane-based potting compounds and other polyesters thermosets becomes quite slow. Above about 7%, the selectivity of the solvent breaks down with such common polymeric materials as those based on polyvinylchloride and polysulfones becoming subject to attack.

A fairly large variety of solvents and solvent mixtures can be used as the major component of the composition of the invention. From a purely utilitarian point of view the lower aliphatic alcohols, i.e, those having 2 to 4 carbon atoms, are most versatile. Of these isopropanol is most preferred. Butanol-based solvents have been found to be somewhat slower in chemical reactivity than is usually desired. These lower aliphatic alcohols are somewhat more volatile than desired for most purposes. In practice it is usually desirable to utilize solvents of relatively low volatility and relatively low inflammability. Thus the further discovery that the ether alcohols, for example the monoalkylene glycol monoalkyl ethers such as ethylene glycol monoalkyl ether, are entirely suitable for forming useful compositions according to the invention has been particularly fortuitous. Other such ethers found to be useful include dialkylene glycol monoalkyl ethers and the like. In general, suitable solvents have cohesive energy density $(cal./cc.)^{1/2}$ above about 8.8; have a dipole moment ($\mu$) below about 1.9; and are strongly hydrogen-bonding, for example as characterized by the method of Gordy as described in the Journal of Paint Technology, volume 38, May 1966; pages 270–271. Suitable strong hydrogen-bonding solvents have a $\gamma$-value of over about 12, and are relatively inert and neutral—that is they must not possess basic character like amines and amides or the acid character of organic acids or the like. As a rule excessive basicity or acidity will present no problem if dissociation constants are below $1\times10^{-15}$. Moreover a rule of reason should be applied to the selection to exclude any excessively volatile compounds like methanol or any compound having an excessively high quantity or number of non-active groups (for example alkyl groups) in its configuration. Hexanol is an example of the latter. Small quantities of other solvents such as dimethylformamide, methyl pyrrolidone, dimethyl sulfoxide, dioxane, and methylene chloride, ketones like acetone or methyl ethyl ketone, and the like may be added in very small quantities, say up to about 5 or 10% of the total formulation to obtain special solvent effects. However, it is emphasized that as such solvents are added in quantities above 5% there is a fairly rapid decrease in the solvating selectivity of the composition. Use of such additional solvents is sometimes useful in some of the less frequent uses of the compositions of the invention: use as a mild etching solvent for certain polyesters and poly diallylphthalate polymers to prepare them for improved adhesive bonding and use in stripping urethane floor finishes from flooring.

The following examples are illustrative of the process of the invention and the products produced thereby. Those skilled in the art, from a reading of the instant specification in conjunction with the following examples, will be able to select compositions of the invention for their particular purpose, making whatever change in components or procedures as appropriate for solution of their particular problem.

EXAMPLE 1

The following materials were mixed together in a compounding kettle under gentle agitation:

| Compound: | Parts by weight |
|---|---|
| Ethylene glycol monomethyl ether | 97.0 |
| Thymolphthalein blue | 0.0008 |
| KOH, mercury cell grade | 2.9 |
| Water | 0.1 |

A cube of flexible urethane foam, one inch on a side, was prepared by reacting toluene di-isocyanate with a polyether triol having a molecular weight of about 3,000. A Freon blowing agent was used in this preparation and a foam of about 5 lbs. per cubic foot resulted.

This polyurethane foam was immersed in a glass jar containing the solvent composition, the preparation of which is described abcve. The foam was dissolved completely within about 15 minutes.

EXAMPLE 2

The procedure of Example 1 was repeated except that ethanol was substituted for the ethylene glycol monomethyl ether solvent.

When the same foam as was tested in Example 1 was placed in this solvent, it dissolved completely in about five minutes.

EXAMPLE 3

The procedure of Example 1 was repeated except that synthetic isopropanol was substituted for the ethylene glycol monomethyl ether. When the same foam as tested in Example 1 was placed in this solvent, it dissolved completely in about eight minutes.

EXAMPLE 4

An epoxy-resin based encapsulation formulation was prepared by blending 100 parts of diglycidyl ether of bisphenol A (epoxide equivalent of 190 grams per epoxide group) with 80 grams of polyazelaic polyanhydride, 0.6 gram of benzyl dimethylamine, and 200 parts of silica flour. This composition was degassed under vacuum, poured into a mold, and cured for 4 hours at 120° C. and further cured for 12 hours at 150° C.

One inch cubes of this epoxy resin were immersed in each of the three solvents described in Example 1 above. The cubes were readily attacked by the alcoholic KOH-based solvent. The cube dissolved completely in 12 hours at room temperature.

EXAMPLE 5

A small electronic circuit board was prepared by attaching two resistors and four capacitors thereto. The circuit board itself was of a polyamide-cured epoxy resin. The resistors and capacitors had vinyl and polysulfone insulation on the wires connected thereto and also had exposed aluminum and magnesium surfaces. This circuit board was encapsulated in a urethane-based potting resin. The potting resin was an adduct of toluene di-isocyanate with a polyether diol, plus sufficient polyether triol to yield an OH to NCO ratio of about 1 to 1. The encapsulated circuit board was cured in an oven for four hours at 150° C. and then twelve additional hours at 100° C. The entire assembly was immersed in the ethylene glycol monomethyl ether-based solvent described in Example 1. After three hours, the urethane-based resin encapsulant had been dissolved entirely. No damage had been sustained by any of the polyvinylchloride or other polymeric insulation; no damage had been done to the epoxy-polyamide matrix board; and no damage had been sustained by the exposed aluminum or magnesium parts.

The residual solvent was washed off the circuit board. The disappearance of the final traces of dye confirmed the complete removal of the solvent.

EXAMPLE 6

The following solvent formulation was prepared:

| Compound: | Parts |
|---|---|
| Ethylene glycol monoethyl ether | 95 |
| KOH | 5 |
| Water | 1 |

This formulation caused no significant chemical attack on amine-cured epoxy resins; vulcanized natural rubber, vulcanized synthetic rubber; polyvinyl chloride; polyethylene; polystyrene; polytetrafluoroethylene; polyimides; polymethacrylate and many more. No. significant attack was noticed on magnesium; nickel plate; beryllium; steel, carbon or stainless; copper, brass or bronze.

Aluminum suffered a weight loss of less than 1% when a 20-mil thick square of the metal, one inch on a side, was immersed in the above-identified formulation for 24 hours at room temperature.

Substantially the same results were achieved when ethylene glycol monobutyl ether and methylene glycol monomethyl ether were used in the above formula instead of ethylene glycol monoethyl ether.

Adjuvants known to the chemical compounding art may be suitably incorporated into the solvent composition with a number of advantageous results. The foregoing examples give an example of such addition in the use of a dye useful in determining the presence of residual solvent during use. Other such adjuvants include thickening agents, for example pyrogenic silica or organic-polymer type thickeners like cellulose ethers (methyl or ethyl cellulose), which enable the glow properties of the compositions to be more precisely controlled. Abrasives also can be incorporated where some mechanical aid is desired in addition to the chemical solvating action of the basic composition. Those skilled in the art, of course, will be able to select any number of such adjuvants to meet their particular purpose.

What is claimed is:

1. A process for recovering electronic devices and wiring from encapsulation in polyurethane, polyester and epoxy potting compounds without damaging said devices or wiring comprising:

(1) immersing said encapsulated devices or wiring in a solvent composition consisting essentially of (a) about 0.1 to 3.0 parts by weight of water, (b) about 3 to 7 parts by weight of an alkali metal hydroxide and (c) about 96.9 to 90 parts by weight of an organic solvent selected from the group consisting of lower monohydric alkanols of 2 to 4 carbon atoms, ethylene glycol mono alkyl ethers wherein the alkyl group contains up to 4 carbon atoms, and mixtures thereof; and (2) maintaining said devices or wiring in said solvent composition until substantially all said potting compound is dissolved and removing residual solvent composition from said devices or wiring.

References Cited

UNITED STATES PATENTS

| | | | |
|---|---|---|---|
| 2,710,843 | 6/1955 | Stebleton | 252—158 |
| 2,662,837 | 12/1953 | Duncan | 134—29 |
| 2,479,628 | 8/1949 | Kuentzel | 252—105 |
| 2,445,064 | 7/1948 | Hall et al. | 252—158X |
| 2,367,273 | 1/1945 | Hall et al. | 252—192X |

LEON D. ROSDOL, Primary Examiner

D. L. ALBRECHT, Assistant Examiner

U.S. Cl. X.R.

134—38, 40; 156—2; 252—79.1, 79.5, 158, 364